United States Patent [19]

Slaker

[11] 3,868,063

[45] Feb. 25, 1975

[54] CORE PROCESSING MACHINE

[75] Inventor: Frank A. Slaker, New Brighton, Minn.

[73] Assignee: Outboard Marine Corporation, Waukegan, Ill.

[22] Filed: Nov. 16, 1973

[21] Appl. No.: 416,373

[52] U.S. Cl. .......................... 241/101.7, 241/186.4
[51] Int. Cl. ............................................. B02c 21/02
[58] Field of Search .......... 201/101 M, 101.7, 186.4

[56] References Cited
UNITED STATES PATENTS
1,954,593   4/1934   Kuly ............................ 241/101.7 X
2,302,973  11/1942   Sargent ......................... 241/101 M Primary Examiner—Granville Y. Custer, Jr.
Assistant Examiner—E. F. Desmond
Attorney, Agent, or Firm—Michael, Best & Friedrich

[57] ABSTRACT

Disclosed herein is a machine for processing soil cores which includes soil and vegetable matter and which are produced in a core-producing machine. The core processing machine includes a hopper supported by a frame in position to receive the soil cores from the core-producing machine, a first screen mounted on the frame and extending outwardly from the hopper, a first conveyor for conveying soil cores in the direction from the hopper and along the first section to the outer end thereof so as to facilitate partial break up of the cores and passage of soil from the cores through the screen, a second screen mounted on the frame in position to receive soil cores from the outer end of the first screen, a second conveyor for moving the soil cores along the second screen so as to facilitate further break-up of the soil cores and passage of soil from the cores through the second screen, and a receptacle removably mounted on the frame in position to receive the remaining portion of the soil cores from the second screen.

14 Claims, 2 Drawing Figures

PATENTED FEB 25 1975  3,868,063

CORE PROCESSING MACHINE

BACKGROUND OF THE INVENTION

The invention relates generally to perforating and aerating machines which produce soil cores and to arrangements for disposing of such soil cores.

Such core-producing machines are disclosed in the Cohrs U.S. Pat. No. 2,800,066 issued July 23, 1957 and in my co-pending U.S. Application Ser. No. 336,381 filed Feb. 27, 1973 and assigned to the assignee of this application.

Such soil cores generally include relatively heavy soil as well as relatively lightweight vegetable matter, such as grass, grass roots, and leaves. In the past, the cores produced by such perforating and aerating machines were usually deposited on the ground and, if desired, were later manually removed.

SUMMARY OF THE INVENTION

The invention provides a core processing machine which desirably serves to crumble or break up the soil cores, to deposit the soil from the broken cores on the ground and to separate and collect such vegetable matter in a removable and replaceable receptacle.

More specifically, the invention provides a core processing machine including a hopper which is supported on a frame and which is located to receive soil cores produced by a core-producing machine. The core processing machine further includes a first perforated wall or screen and a first conveyor means for displacing the soil cores from the hopper and along the screen so as to facilitate breaking up or crumbling of the cores incident to passage along the screen and to permit passage of soil from the broken or partially crumbled cores through the screen and onto the ground.

Preferably, the first screen or perforated wall extends upwardly from the hopper and discharges the partially broken cores onto a second screen or perforated wall which is in the form of a transversely extending trough. Associated with the trough is a second conveyor means which is preferably in the form of a rotating brush and which, incident to displacing the cores along the second screen, causes further crumbling of the cores and separation of the relatively light vegetable material from the soil. Such relatively light vegetable material is conveyed or transported by the second conveyor to a removable receptacle, while the relatively heavy soil passes through the screen and is deposited on the ground.

In addition, there is preferably provided a drag mat which is dragged along the ground to facilitate dispersion and deposit in the grass of the soil which passes through the screens.

One of the principal features of the invention is the provision of a machine for breaking up or crumbling of soil cores.

Another of the principal features of the invention is the provision of a machine for breaking up soil cores and separating the soil from the vegetable material.

Another of the principal features of the invention is the provision of a machine for breaking up soil cores and collecting the vegetable material so as to avoid deposit of such vegetable material on the ground.

Still another of the principal features of the invention is the provision of a machine for processing soil cores so as to break up the cores into soil and vegetable matter and so as to return the soil to the ground and collect the vegetable matter.

Still another of the principal features of the invention is the provision of a soil processing machine which is economical to construct and which will provide reliable operation over a long and useful life.

DRAWINGS

Figure 1:
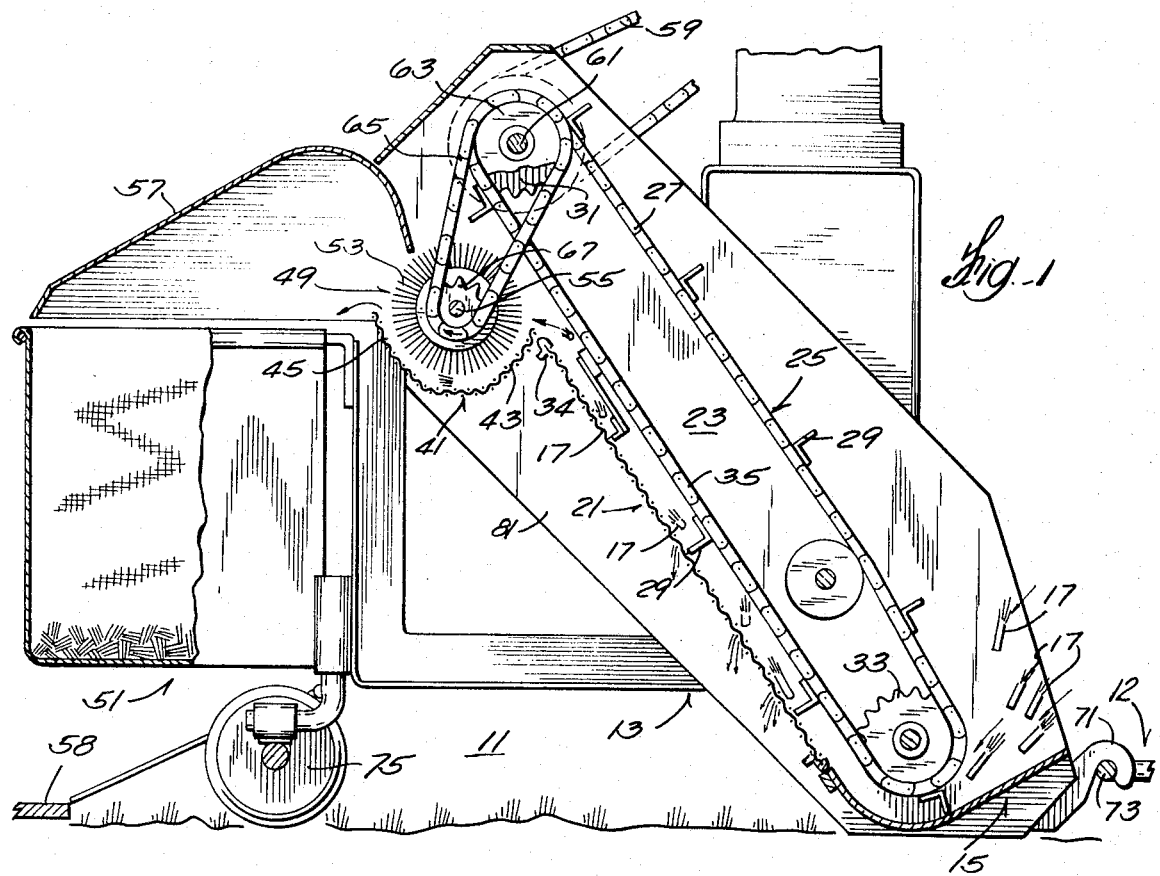
FIG. 1 is a side elevational view, partially broken away and in section, of a core processing machine in accordance with the invention.
Figure 2:
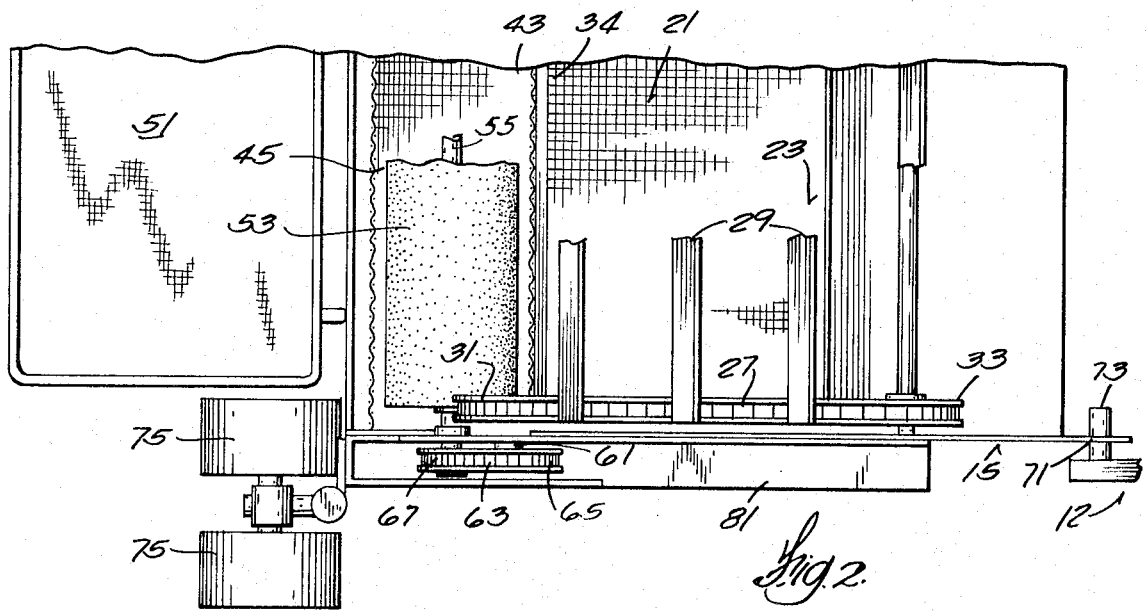
FIG. 2 is a fragmentary top elevational view of the machine shown in FIG. 1.

Before explaining the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown in the drawings is a core processing machine or apparatus 11 which embodies various of the features of the invention and which is adapted to be attached to and partially supported by a fragmentarily illustrated core-producing machine 12, such as is described in U.S. Application Ser. No. 336,381 filed Feb. 27, 1973 and assigned to the assignee of this application. However, the core processing machine of the invention could be bodily incorporated in the core-producing machine or could be completely self supporting.

More specifically, the illustrated soil core processing machine 11 comprises a frame 13 which can be suitably fabricated and which supports a hopper 15 located and suitably constructed to receive soil cores 17 produced by the soil core-producing machine 12. The hopper 15 includes a forward wall which extends upwardly and an upwardly extending rear wall.

Supported by the frame 13 and extending from the hopper 15 is a first screen or perforated wall 21 which extends upwardly from the rear of the hopper and which is generally of flat form and can be fabricated of expanded metal to facilitate crumbling or breaking up of the soil cores 17 and passage of soil therethrough incident to travel of the soil cores 17 along the flat screen or perforated wall 21.

Also supported by the frame 13 and extending above the flat perforated wall or screen 21 is a first conveyor means 23 which includes an endless structure 25 comprising a pair of transversely spaced chains 27 which carry longitudinally spaced bars or flights 29. The conveyor means 23 also includes a drive sprocket 31 and a spaced idler sprocket 33 which are located to position one run 35 of the conveyor in adjacent relation to the flat perforated wall or screen 21 and to provide for conveyance of the soil cores 17 from the hopper 15 along the flat perforated wall or screen 21 to the outer end 34 thereof.

Preferably, the flat perforated wall or screen 21 extends rearwardly and upwardly from the hopper 15 to elevate the soil cores 17 while displacing the soil cores therealong so as to facilitate partial crumbling and breaking up of the soil cores 17.

Also supported by the frame 13 is a second perforated wall or screen 41 which is preferably in the form of a transversely extending trough and which includes a transversely extending portion 43 receiving the soil cores from the flat perforated wall or screen 21, and a transversely extending discharge portion 45 spaced from the receiving portion 43. Preferably, the trough or screen 41 is located below the outer or upper end 34 of the flat perforated wall or screen 21 and is formed of expanded metal, although other shapes and constructions could be used. Depending upon the consistency of the soil involved, the size of the perforations or openings in the screens or walls 21 and 41 can be varied so as to obtain optimum performance.

Also supported by the frame 13 is a second conveyor means 49 for conveying the soil cores 17 from the receiving portions 43 of the trough or screen 41 to the discharge portion 45 for delivery of the remaining portion of the soil cores 17 into a removable receptacle 51. Preferably, the second conveyor means 49 is especially adapted to continue the breaking up or crumbling of the soil cores 17 and to cause transport of the relatively light vegetable material to the receptacle 51. In the illustrated construction, the second conveyor means 49 comprises a generally cylindrical brush 53 mounted on a transverse shaft 55 rotatably supported by the frame 13. Other rotary means, such as, for instance, a paddle structure, could be employed.

The removable receptacle 51 is supported by the frame 13 rearwardly of the trough or screen 41 in position to receive the remaining portion of the soil cores from the discharge portion 45 of the trough or screen 41 and can be mounted in any convenient manner to facilitate removal and replacement.

Supported by the frame 13 above the top or open mouth of the receptacle 51 is a deflector 57 which preferably extends at least partially over the trough or screen 51 and brush 53 to guide travel of the remaining portion of the soil cores 17 and particularly the relatively lightweight vegetable matter from the trough or screen 41 into the receptacle 51.

Flexibly connected to the frame 13 in position rearwardly of the trough or screen 51 is a flexible drag mat 58 which aids in distributing the soil over the ground and settling the soil into the grass.

The conveyor means 23 and 49 can be simultaneously driven in any suitable manner. In the illustrated construction, the drive sprocket 31 of the first conveyor means 23 is connected by a chain 59 to a power source (not shown) which can be an internal combustion engine mounted on the frame 13 or a hydraulic motor (not shown) mounted on the frame 13 and supplied with pressure fluid from a pump (not shown) mounted either on the frame 13 or on the core-producing machine 12 or otherwise.

The drive sprocket 31 is carried by a shaft 61 which is rotatably supported by the frame 13 and which also carries a second sprocket 63 connected by a chain 65 to a sprocket 67 on the brush shaft 55. As can be seen from the drawings, the chain and sprocket connection between the first conveyor means 23 and the second conveyor means 49 is such as to rotate the brush shaft 55 at a faster rate than the conveyor shaft 61.

The core processing machine 11 can be supported for travel over the ground in various ways. In the specifically illustrated construction, the front end of the core processing machine 11 is supported by the core-producing machine 12 so as to maintain the hopper 15 out of engagement with the ground under normal operating conditions. Accordingly the front end of the frame 13 includes transversely spaced and aligned hooks 17 which are adapted to engage supporting studs 73 on the core processing machine 12. At the rear, the frame 13 is carried by a pair of transversely spaced caster wheels 75.

Suitable guards 81 are provided for enclosing various of the moving parts of the apparatus.

In operation, soil cores 17 deposited in the hopper 15 by the core processing machine 12 are carried rearwardly and upwardly along the flat screen or perforated wall 21 by the conveyor means 23. Such movement causes the soil cores 17 to partially crumble or break up with resultant passage of the soil through the screen 21 for return to the ground. The remaining core portions, including soil and vegetable matter, such as roots, leaves, etc., travel over the outer end of the flat screen or perforated wall 21 and fall into the screen or trough 41. In the trough 41, the cores are displaced by the rotary action of the brush 53 to further crumble the cores 17 and, at the same time, to transport the relatively light vegetable matter toward the receptacle 51 for deposit therein. The soil passing through the screens 21 and 41 is deposited on the ground and the mat 58 serves to spread the soil and to deposit the soil on the ground between the grass stalks or blades.

At least some of the advantages of the invention can be employed by using the first screen 21 and conveyor means 23 without the remaining portions of the structure with resultant deposit of the vegetable matter on the ground. Additional advantages of the invention are, of course, obtained by employing the second screen 41 and conveyor means 49, as well as the removable receptacle 51 and the drag mat 58.

Various of the features of the invention are set forth in the following claims.

I claim:

1. A machine for processing soil cores which include soil and vegetable matter and which are produced in a core-producing machine, said core processing machine including a frame, a hopper supported by said frame in position to receive the soil cores from the core-producing machine, means for supporting said frame for travel over the ground with said hopper out of engagement with the ground under normal operating conditions, a first wall mounted on said frame and extending outwardly from said hopper and including an outer end and perforations between said hopper and said outer end, and first conveyor means for conveying soil cores in the direction from said hopper and along said first wall, whereby to facilitate partial break-up of the soil cores and passage of soil from the cores through said perforations in said first wall.

2. A machine for processing soil cores in accordance with claim 1 wherein said first conveyor means is located above said first wall with one run thereof in adjacent relation to said first wall and includes a series of spaced and interconnected bars movable outwardly along said first wall from said hopper.

3. A machine for processing soil cores in accordance with claim 1 and further including a second wall mounted on said frame and including a first portion located in position to receive soil cores from said outer end of said first wall, a second portion spaced from said first portion, and perforations between said first and second portions, and second conveyor means for moving the soil cores along said second wall, whereby to facilitate further break-up of the soil cores and passage of soil from the cores through said perforations in said second wall.

4. A machine for processing soil cores in accordance with claim 3 and further including a receptacle removably mounted on said frame in position to receive the remaining portion of the soil cores from said second portion of said second wall.

5. A machine for processing soil cores in accordance with claim 4 and further including a deflector extending above said receptacle in position for guiding deposit of the remaining portion of the soil cores into said receptacle.

6. A machine for processing soil cores in accordance with claim 3 wherein said second wall comprises a trough extending transversely to the direction of movement of said first conveyor.

7. A machine for processing soil cores in accordance with claim 6 wherein said second conveyor comprises means rotatable about an axis extending transversely to the direction of movement of said first conveyor.

8. A machine for processing soil cores in accordance with claim 7 wherein said means comprises a rotatable brush.

9. A machine for processing soil cores in accordance with claim 3 and further including a drive train for simultaneously operating said first and second conveyor means.

10. A machine for processing soil cores in accordance with claim 3 wherein said first wall extends upwardly and said second wall is located below said outer end of said first wall.

11. A machine for processing soil cores in accordance with claim 3 and further including a drag mat located rearwardly of said second wall in position to be dragged over the ground in response to movement of the machine over the ground.

12. A machine for processing soil cores in accordance with claim 1 wherein said frame supporting means includes means on the forward part of said frame for supporting said core processing machine from the core-producing machine, and caster wheel means mounted on the rear of said frame for support of said core processing machine from the ground.

13. A machine for processing soil cores in accordance with claim 1 and further including a drag mat located rearwardly of said frame in position to be dragged over the ground in response to movement of the machine over the ground.

14. A machine for processing soil cores in accordance with claim 1 wherein said hopper includes a forward wall extending upwardly and said first wall extends upwardly from the rear of said hopper.

* * * * *